United States Patent
Jones (10) Patent No.: US 9,086,268 B2
(45) Date of Patent: Jul. 21, 2015

(54) CONCRETE BLOCK SPACER SYSTEM

(71) Applicant: Jonathan E Jones, Tifton, GA (US)

(72) Inventor: Jonathan E Jones, Tifton, GA (US)

( * ) Notice: Subject to any disclaimer, the term of this patent is extended or adjusted under 35 U.S.C. 154(b) by 0 days.

(21) Appl. No.: 14/044,342

(22) Filed: Oct. 2, 2013

(65) Prior Publication Data

US 2015/0089825 A1    Apr. 2, 2015

(51) Int. Cl.
| | | |
|---|---|---|
| E04B 2/02 | (2006.01) | |
| E04C 1/00 | (2006.01) | |
| E04B 2/08 | (2006.01) | |
| G01B 3/30 | (2006.01) | |
| G01B 5/14 | (2006.01) | |
| G01B 5/25 | (2006.01) | |

(52) U.S. Cl.
CPC ... *G01B 3/30* (2013.01); *E04B 2/02* (2013.01); *E04B 2/08* (2013.01); *E04C 1/00* (2013.01); *G01B 5/14* (2013.01); *G01B 5/25* (2013.01); *E04B 2002/028* (2013.01); *E04B 2002/0282* (2013.01)

(58) Field of Classification Search
CPC ............. G01B 3/30; G01B 5/25; G01B 5/14; E04C 1/00; E04B 2/08; E04B 2/02; E04B 2002/0254; E04B 2002/028
USPC .......... 52/582.1, 586.1, 586.2, 596, 603, 604, 52/605, 606, 747.12
See application file for complete search history.

(56) References Cited

U.S. PATENT DOCUMENTS

| | | | | |
|---|---|---|---|---|
| 830,094 | A | * | 9/1906 | Momsen ...................... 52/302.4 |
| 1,968,393 | A | * | 7/1934 | Henderson ......................... 52/98 |
| 2,029,082 | A | * | 1/1936 | Odam .............................. 52/275 |
| 2,527,985 | A | | 10/1950 | Burroway |
| 2,641,921 | A | * | 6/1953 | Lacy ................................ 52/568 |
| 2,930,135 | A | | 3/1960 | Rodtz |
| 2,963,828 | A | * | 12/1960 | Belliveau ........................ 52/564 |
| 3,196,581 | A | | 7/1965 | Castelli |
| 3,209,510 | A | * | 10/1965 | Masamitsu ................ 52/745.17 |
| 3,229,004 | A | * | 1/1966 | Levine ............................ 264/31 |
| 3,295,281 | A | * | 1/1967 | Dixon ............................. 52/442 |
| D210,073 | S | * | 2/1968 | Wright ......................... D25/118 |

(Continued)

FOREIGN PATENT DOCUMENTS

| | | | |
|---|---|---|---|
| CA | 2245149 A1 | * | 2/2000 |
| GB | 2136847 A | * | 9/1984 |

(Continued)

OTHER PUBLICATIONS

Search Report and Written Opinion mailed Jan. 6, 2015 for corresponding International Application PCT/US2014/058867 (8 pages).*

*Primary Examiner* — Rodney Mintz
(74) *Attorney, Agent, or Firm* — J. Wiley Horton; Adrienne C. Love (57) ABSTRACT

A method for aligning concrete masonry units for a concrete structure is disclosed. In the present method a plurality of concrete masonry units are provided. Each concrete masonry unit includes six sides, including a top and a bottom and preferably two cores or vertical voids therein. The top and bottom of the concrete masonry unit each include two lateral grooves along the length of the block. The lateral grooves are designed to accept the spacers provided in the present method. Spacers consist of a planar member and at least one finger. Planar member is inserted into the lateral groove of a concrete masonry unit for use. Once inserted the fingers of the spacer sit within a joint between the concrete masonry units.

13 Claims, 14 Drawing Sheets

(56) References Cited

U.S. PATENT DOCUMENTS

| | | | |
|---|---|---|---|
| 3,374,703 A * | 3/1968 | Davis et al. ................ 411/466 |
| 3,420,031 A | 1/1969 | Castelli |
| 3,426,497 A | 2/1969 | Mundy |
| 3,609,926 A * | 10/1971 | Muse ............................... 52/439 |
| 3,902,296 A * | 9/1975 | Thomas ..................... 52/747.12 |
| 4,091,587 A * | 5/1978 | Depka ............................. 52/421 |
| 4,110,949 A * | 9/1978 | Cambiuzzi et al. ............ 52/437 |
| 4,114,337 A * | 9/1978 | Neuhardt ........................ 52/442 |
| 4,277,927 A | 7/1981 | Richter |
| 4,321,779 A * | 3/1982 | Kratchmer ..................... 52/425 |
| 4,324,080 A * | 4/1982 | Mullins ..................... 52/309.12 |
| 4,426,815 A * | 1/1984 | Brown ............................ 52/100 |
| 4,454,699 A * | 6/1984 | Strobl ........................... 52/585.1 |
| 4,633,639 A * | 1/1987 | Deimen ....................... 52/591.2 |
| 4,774,793 A | 10/1988 | Mayer |
| 5,056,289 A * | 10/1991 | Colen ............................. 52/564 |
| 5,122,015 A * | 6/1992 | Shen ............................ 405/284 |
| 5,191,718 A | 3/1993 | Fox |
| 5,224,314 A * | 7/1993 | Chen .............................. 52/308 |
| 5,248,226 A * | 9/1993 | Risi et al. ..................... 405/284 |
| 5,288,534 A * | 2/1994 | Tavshanjian ................ 428/64.1 |
| 5,365,714 A * | 11/1994 | Potvin ......................... 52/590.2 |
| 5,417,523 A * | 5/1995 | Scales .......................... 405/284 |
| 5,465,542 A * | 11/1995 | Terry .......................... 52/309.7 |
| 5,540,525 A * | 7/1996 | Miller et al. .................. 405/284 |
| 5,592,798 A | 1/1997 | Friesen et al. |
| 5,595,460 A * | 1/1997 | Miller et al. .................. 405/284 |
| 5,619,835 A * | 4/1997 | Bailey et al. .................... 52/606 |
| 5,623,799 A * | 4/1997 | Kowalski et al. ............... 52/392 |
| 5,802,797 A * | 9/1998 | Storer-Folt ...................... 52/604 |
| 5,829,217 A | 11/1998 | Colen |
| 5,907,937 A * | 6/1999 | Loftus et al. .................... 52/308 |
| 5,993,283 A * | 11/1999 | Cyrus et al. ................... 446/124 |
| 6,035,599 A * | 3/2000 | Sonnentag ..................... 52/604 |
| D429,346 S * | 8/2000 | Martin, Jr. .................. D25/117 |
| 6,138,426 A * | 10/2000 | Mork et al. ..................... 52/562 |
| 6,168,354 B1 * | 1/2001 | Martin et al. ................. 405/284 |
| 6,189,282 B1 * | 2/2001 | VanderWerf ................. 52/582.1 |
| 6,349,520 B2 * | 2/2002 | Kubica ........................... 52/426 |
| 6,612,045 B2 * | 9/2003 | Kruskamp ...................... 33/526 |
| 6,701,687 B1 * | 3/2004 | Shillingburg .................... 52/606 |
| 6,763,644 B1 * | 7/2004 | Toledo ........................ 52/592.6 |
| 6,810,633 B2 * | 11/2004 | Harris, Sr. ..................... 52/489.2 |
| 6,857,240 B1 | 2/2005 | MacAlister |
| 6,912,823 B2 * | 7/2005 | MacDonald et al. ........... 52/574 |
| 7,290,377 B2 * | 11/2007 | Dupuis ........................... 52/564 |
| 7,328,537 B2 * | 2/2008 | Hammer ........................ 52/604 |
| 7,461,490 B2 * | 12/2008 | Toledo ............................ 52/605 |
| 7,555,872 B1 | 7/2009 | Beach |
| 7,591,447 B2 * | 9/2009 | Hammer et al. .............. 249/104 |
| 7,597,504 B2 * | 10/2009 | McNear ....................... 405/284 |
| 7,762,033 B2 * | 7/2010 | Scott et al. ...................... 52/425 |
| 7,765,765 B1 * | 8/2010 | Perronne ..................... 52/742.14 |
| 7,946,093 B1 * | 5/2011 | Sturino ....................... 52/749.11 |
| 8,240,105 B2 * | 8/2012 | Dueck ............................ 52/604 |
| D678,039 S * | 3/2013 | Psaila .......................... D8/354 |
| 8,413,399 B2 * | 4/2013 | Kelley, Jr. ....................... 52/562 |
| D688,816 S * | 8/2013 | MacDonald ................. D25/114 |
| 8,707,652 B2 * | 4/2014 | Kim et al. ....................... 52/605 |
| 8,820,024 B1 * | 9/2014 | Abdullah et al. ............... 52/605 |
| 8,887,466 B2 * | 11/2014 | Alvarez Moysen ............ 52/505 |
| 8,956,084 B2 * | 2/2015 | Kelly, Jr. ....................... 405/284 |
| 2002/0121027 A1 * | 9/2002 | Kruskamp ....................... 33/526 |
| 2002/0152708 A1 * | 10/2002 | Kimura et al. .................. 52/596 |
| 2003/0002925 A1 * | 1/2003 | Blomquist et al. ............ 405/284 |
| 2003/0024189 A1 * | 2/2003 | Hughes et al. .................. 52/271 |
| 2003/0070383 A1 * | 4/2003 | Heinle ........................ 52/582.1 |
| 2003/0074856 A1 * | 4/2003 | Hammer ......................... 52/604 |
| 2004/0040249 A1 * | 3/2004 | Herbison ........................ 52/677 |
| 2004/0182029 A1 | 9/2004 | Berg |
| 2005/0108973 A1 * | 5/2005 | Hammer et al. ................ 52/596 |
| 2007/0245660 A1 * | 10/2007 | Scott et al. ...................... 52/438 |
| 2008/0134605 A1 | 6/2008 | Friesen et al. |
| 2008/0148661 A1 * | 6/2008 | Belsley ........................ 52/293.2 |
| 2008/0148675 A1 * | 6/2008 | Belsley ........................ 52/592.6 |
| 2009/0205282 A1 * | 8/2009 | Belsley ........................... 52/565 |
| 2010/0095628 A1 * | 4/2010 | Belsley ........................... 52/562 |
| 2011/0061328 A1 * | 3/2011 | Sandy et al. ................. 52/582.1 |
| 2011/0162311 A1 * | 7/2011 | Wennberg ....................... 52/578 |
| 2012/0073230 A1 * | 3/2012 | Klein et al. ..................... 52/438 |
| 2012/0090259 A1 * | 4/2012 | Muirhead et al. ............ 52/585.1 |
| 2012/0090260 A1 * | 4/2012 | Muirhead et al. ............ 52/585.1 |
| 2012/0233952 A1 * | 9/2012 | Hammer ...................... 52/588.1 |
| 2013/0034392 A1 * | 2/2013 | Ferraiolo ...................... 405/284 |
| 2013/0205688 A1 * | 8/2013 | Muirhead et al. ............ 52/122.1 |
| 2014/0007529 A1 * | 1/2014 | Alvarez Moysen ......... 52/220.2 |
| 2014/0250819 A1 * | 9/2014 | Abdullah et al. ............... 52/605 |

FOREIGN PATENT DOCUMENTS

WO      WO 9616238 A1 *   5/1996
WO      WO 03095764 A1 *   11/2003

* cited by examiner

CONCRETE BLOCK SPACER SYSTEM

BACKGROUND OF THE INVENTION

1. Field of the Invention

This invention relates to a system and method of aligning concrete blocks in construction. More specifically, the invention comprises a system of utilizing spacers and modified concrete masonry units to construct a correctly aligned structure.

2. Description of the Related Art

Figure 1:
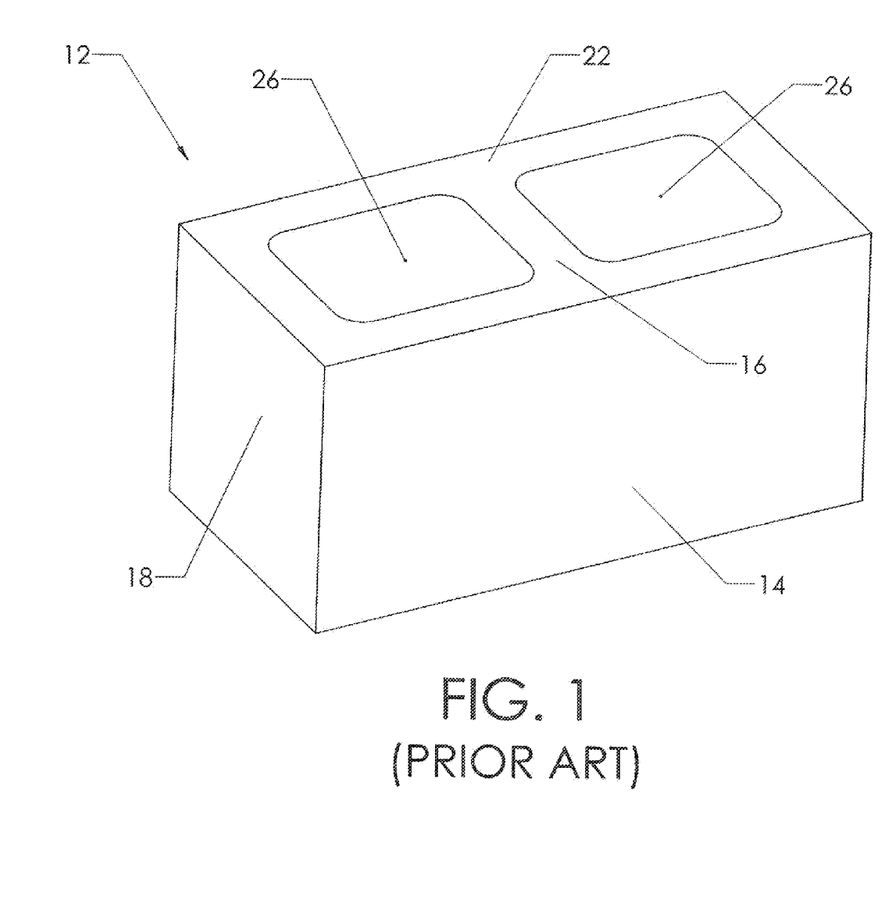
FIG. 1 is a perspective view, showing a prior art concrete masonry unit.
Figure 2:
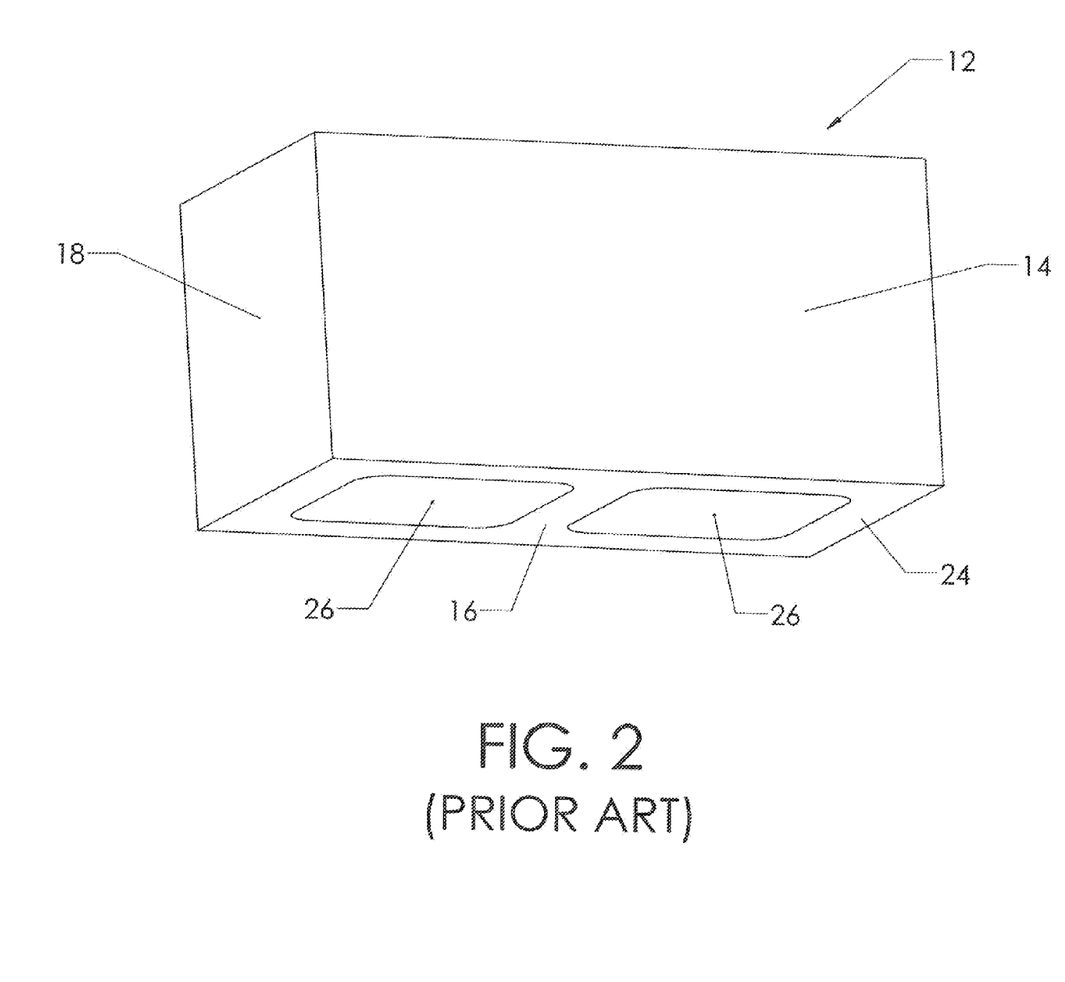
FIG. 2 is a perspective view, showing a prior art concrete masonry unit.

The construction of a building or the assembly of infrastructure requires a variety of materials. A concrete masonry unit ("CMU"), or concrete block, is an extremely common large rectangular brick used in construction. Strong, durable walls can be produced using concrete blocks. Concrete masonry units 12 are typically produced with hollow centers, or cores, and six sides, as illustrated in FIG. 1. Cores 26 pass through the concrete masonry unit 12, from the top side 22 to the bottom side 26 (as shown in FIG. 2). The cores can provide continuous vertical voids that are often reinforced. Steel bars can be placed in the cores with grout installed surrounding the bars. The top side 22 and bottom side 24 include a length and a width and typically include a medial edge which extends between the two cores. The sides 14 connect the first end 18 to the second end 18.

There are three primary components which make up the structural system of a concrete block wall including the blocks and the mortar that holds them together, the reinforcement, and the grout, which is used to fill in the cores in the concrete block. When constructing a concrete wall, it is extremely important that the concrete blocks are plumb and level. Thus, setting the blocks in the mortar requires precision.

Figure 3:
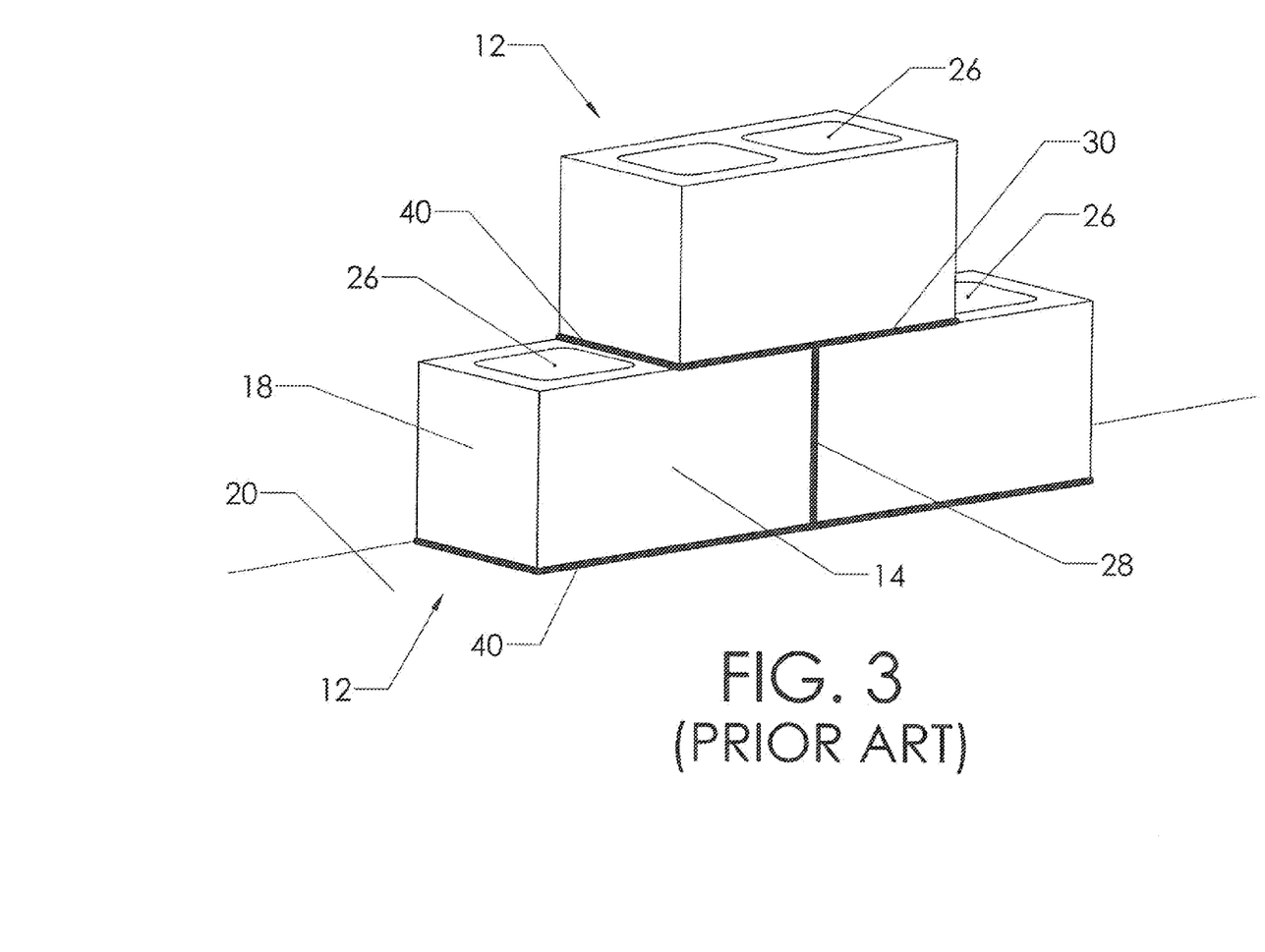
FIG. 3 is a perspective view, showing a prior art wall construction of concrete masonry units, mortar and reinforcement.
Figure 4:
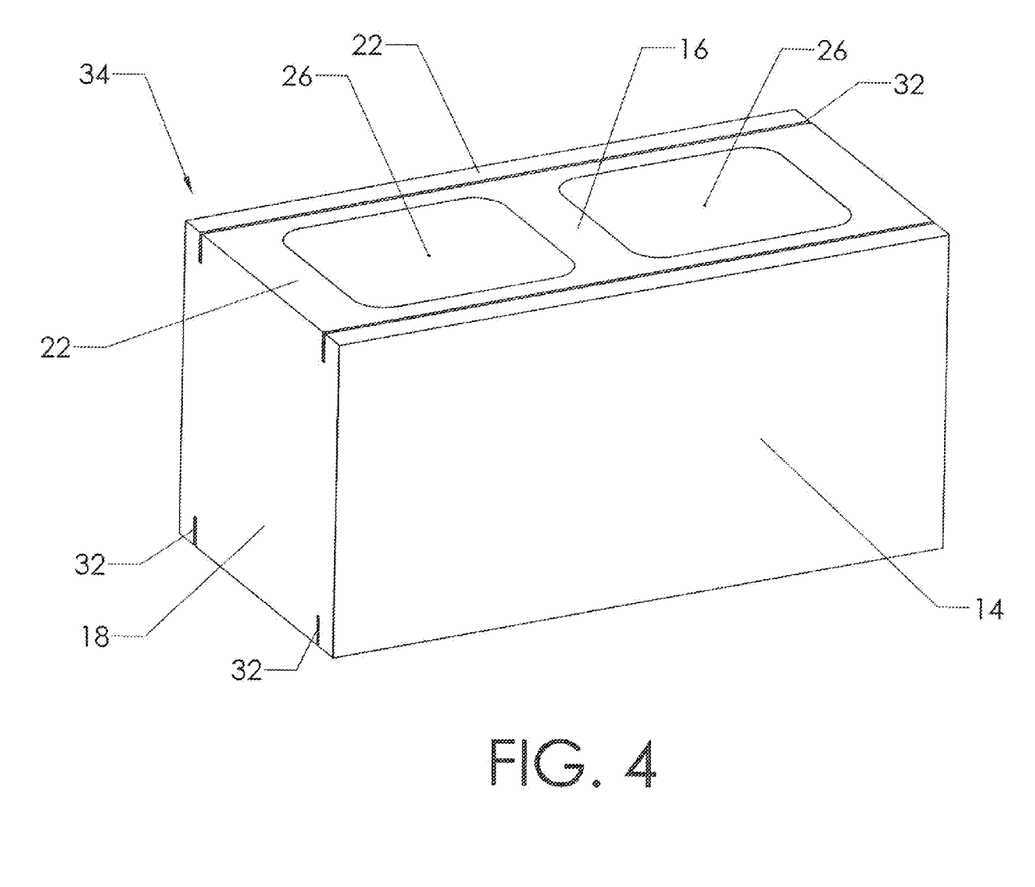
FIG. 4 is a perspective view, showing a concrete masonry unit in the present method including lateral grooves along the top outer edge (top side).

FIG. 3 illustrates a prior art concrete wall construction consisting of a few concrete blocks. The reader will appreciate that the wall would, in reality, consist of numerous concrete blocks. In order to construct the prior art wall the builder spreads a layer of mortar on a solid, level surface and proceeds to lay the first row of concrete blocks prior to laying the additional rows. The horizontal joints between the units are called bed joints while the vertical joints are called head joints. The additional layers of blocks are typically oriented such that the mid-section (or medial edge) of the concrete block sits over the head joint of the lower blocks. This type of construction is referred to as "running bond construction." However, various bond or joint patterns can be created. In any pattern created, each block must be plumb and level while remaining a set distance from one another. The builder must align the blocks efficiently, so that the mortar does not dry before the blocks are properly aligned.

Ensuring that each block is plumb and level can be very tedious. Additionally, mortar joints often require specific measurements or spacing. A misalignment can cause cracking or other structural weakness. Repeated measurements and adjustments are common in prior art systems. Several systems have been implemented to simplify the process. However, no prior art system provides an efficient and effective manner for aligning the blocks both vertically and horizontally such that the blocks are plumb, level and adequately spaced apart. The present system achieves this objective.

BRIEF SUMMARY OF THE INVENTION

The present invention comprises a method for aligning concrete masonry units for a concrete structure. In the present method a plurality of concrete masonry units are provided. Each concrete masonry unit includes six sides, including a top and a bottom and preferably two cores or vertical voids therein. The top and bottom of the concrete masonry unit each include two lateral grooves along the length of the block. The lateral grooves are designed to accept the spacers provided in the present method. Spacers consist of a planar member and at least one finger. Planar member is inserted into the lateral groove of a concrete masonry unit for use. Once inserted the fingers of the spacer sit within a joint between the concrete masonry units.

In the preferred embodiment spacers are oriented at the intersection of two joints and at consistent intervals between the joint intersections so as to maintain an adequate space within the joint and to maintain the concrete masonry unit in a square orientation.

| REFERENCE NUMERALS IN THE DRAWINGS | |
|---|---|
| 10 concrete masonry unit spacer system | 12 concrete masonry unit |
| 14 sides | 16 medial edge |
| 18 ends | 20 surface |
| 22 top side | 24 bottom side |
| 26 cores | 28 head joint |
| 30 bed joints | 32 grooves |
| 34 modified CMU | 36 spacers |
| 38 horizontal finger | 40 mortar |
| 42 vertical finger | 44 planar member |

DETAILED DESCRIPTION OF THE INVENTION

The present method of aligning concrete masonry units in the construction of a structure improves on the prior art methods of building concrete walls, as illustrated in FIGS. 1-3, shown and described above. As is known in the prior art and illustrated in FIGS. 1 and 2, a concrete masonry unit 12 generally consists of rectangular blocks having two central cores 26 (voids) and six sides (or walls), including top and a bottom. Concrete masonry units and concrete blocks are referred to synonymously throughout this description.

FIG. 3 illustrates a prior art constructed wall. The builder aligns concrete masonry units 12 on a solid, level surface 20 which includes a layer of mortar 40. Each row of concrete blocks 12 must be level, plumb and accurately spaced apart. Cores 26 are preferably aligned such that reinforcement (e.g. steel bars and grout) can be provided through several blocks 12. The joints between the concrete blocks 12 include mortar 40. The vertical joints are commonly referred to as head joints 28 while the horizontal joints are called bed joints 30. The concrete blocks 12 are oriented such that the head joints 28 meet the mid-section of the concrete block above the respective head joint 28. This particular bond or joint pattern is referred to in the industry as a "running bond construction". The reader will appreciate that although a "running bond construction" pattern is shown, the present method can be used in constructing any known bond or joint pattern. Some examples of concrete masonry patterns in the industry include a running bond, horizontal stack, vertical stack, diagonal basket weave, diagonal bond, basket weave and coursed ashlar.

The present method provides a plurality of modified concrete masonry unit. Modified concrete masonry unit 34, or modified concrete block, includes two lateral grooves 32 along top 22 and two lateral grooves 32 along bottom 24 of the concrete block 34. Lateral grooves can be pre-manufactured in the modified concrete blocks 34 or cut or scored into the concrete blocks after manufacture. It is important that lateral grooves 32 are appropriately deep so that the spacers 36 fit uniformly into each groove 32.

A series of spacers 36 are also provided in the present method and illustrated in FIGS. 5-9. Spacers 36 generally include planar member 44 and at least one finger member 38, 42. Finger members 38, 42 provide the required spacing by protruding into the gap between two concrete blocks and/or a concrete block and a surface or other object. Planar members 44 fit into lateral grooves 32. FIGS. 5-9 include a number of different embodiments of spacers 36. However, the invention should not be limited to any one specific embodiment of a spacer 36. Additionally, each and every spacer can be turned or rotated to serve the required purpose of the particular joint being served. Thus, the use of the term "horizontal" and "vertical" with regard to the fingers 38, 42 is merely for purposes of explanation rather than limiting the fingers to a particular orientation.

Figure 5:
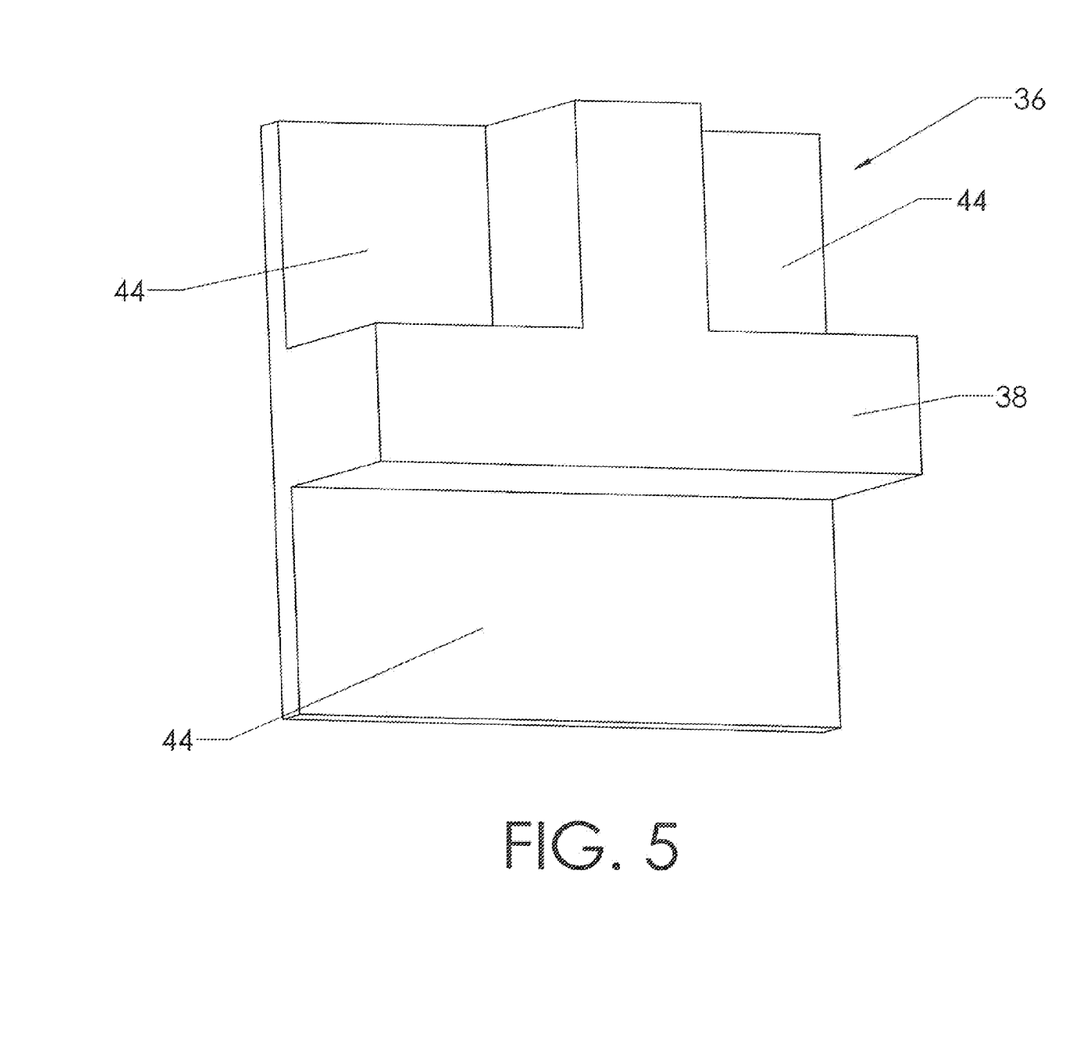
FIG. 5 is a perspective view, showing a spacer provided in the present method.
Figure 14:
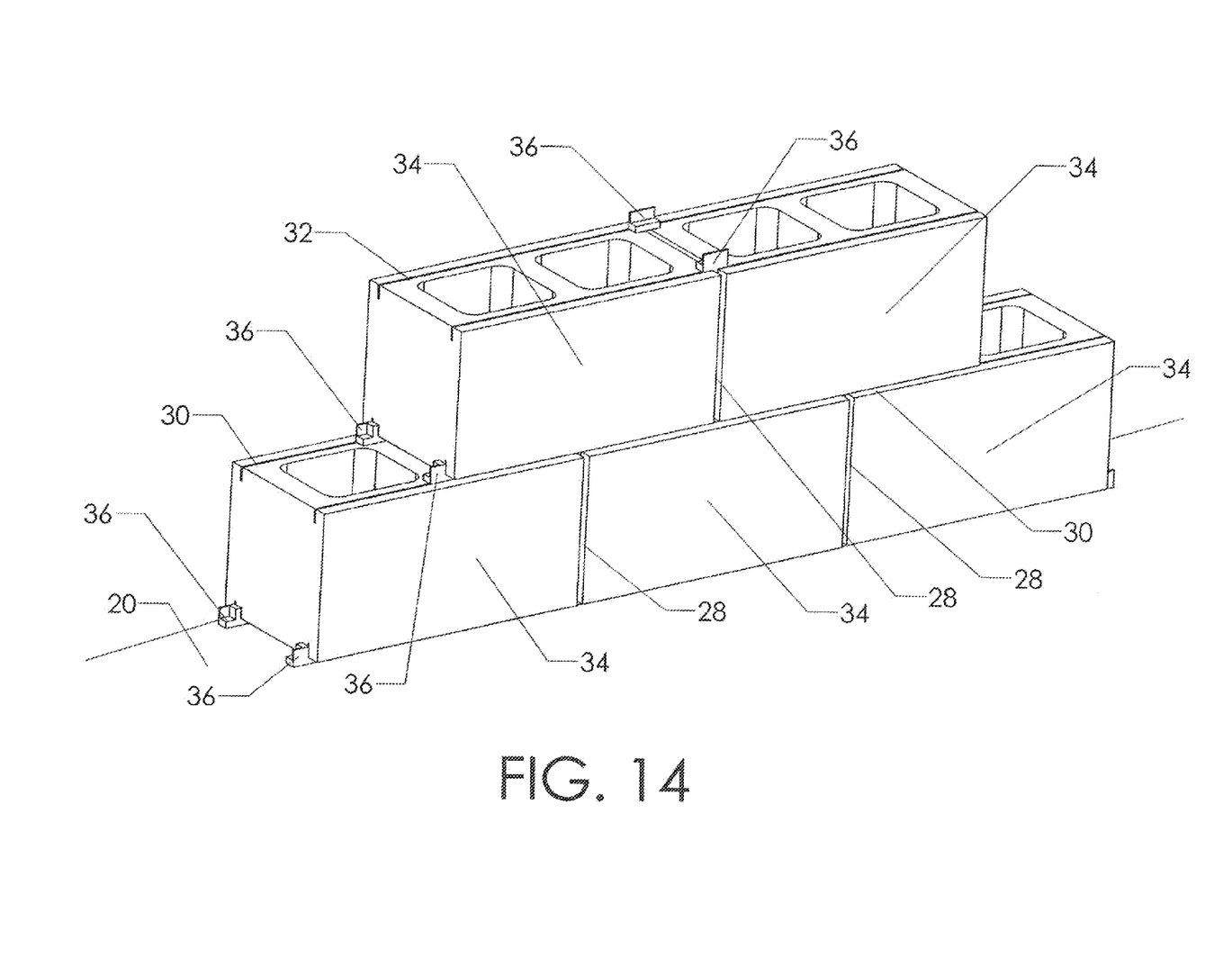
FIG. 14 is a perspective view, showing a concrete masonry unit wall construction using the present method.

FIG. 5 illustrates spacer 36 which includes a horizontal finger 38 extending the full length of planar member 44 and a vertical finger 42 which extends upward from horizontal finger 38 along the upper half of planar member 44. Planar member 44 fits into lateral grooves 32 on three proximate concrete masonry blocks 34, as illustrated in FIG. 14, and further described herein. Horizontal finger 38 provides spacing in a bed joint 30, while vertical finger 42 provides spacing in a head joint 28. However, spacer 36 can be rotated such that the fingers are inserted into the opposing joints.

Figure 6:
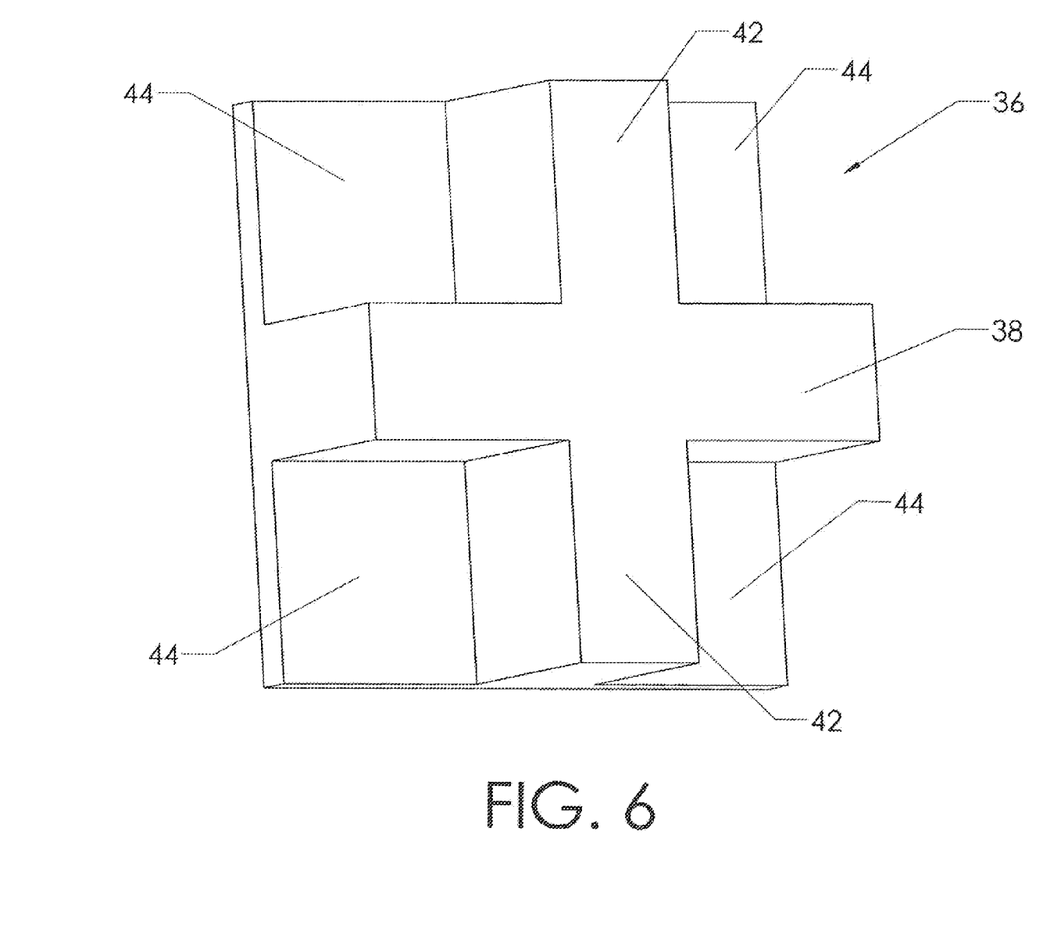
FIG. 6 is a perspective view, showing a spacer provided in the present method.

A second spacer 36 is illustrated in FIG. 6. Second spacer 36 includes a horizontal finger 38 and vertical finger 42 extending fully across planar member 44 in a perpendicular fashion. Spacer 36 in FIG. 6 is used to assist the connection of four concrete blocks. Specifically, planar member 44, divided into four sections by the orientation of fingers 38, 42 fits into the lateral grooves of four proximate concrete blocks. This type of pattern for stacking concrete blocks is known in the industry to be a "horizontal stack".

Figure 7:
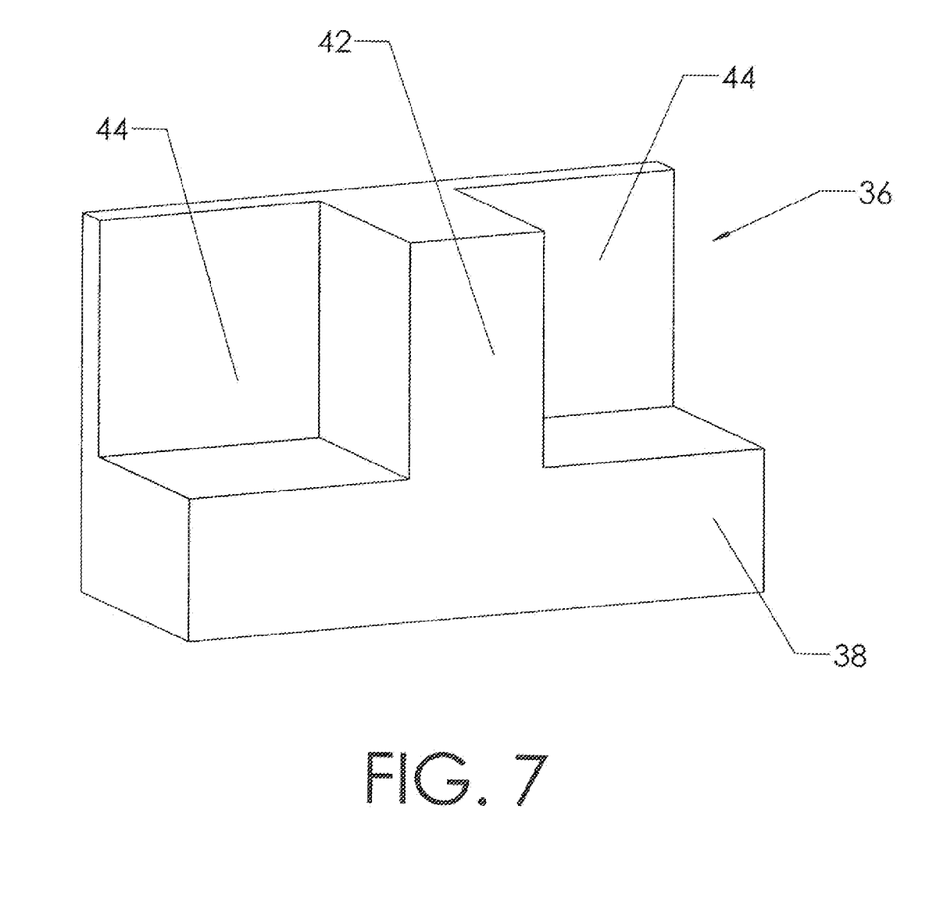
FIG. 7 is a perspective view, showing a spacer provided in the present method.

FIG. 7 illustrates a third spacer 36 designed to provide spacing on the base of a concrete wall. Horizontal finger 38 extends across the lower portion of planar member 44, while vertical finger 42 extends upward from horizontal finger 38. Planar member 44 fits into the lateral grooves of two proximate concrete blocks. Spacer 36 thereby operates to provide a set distance from a level surface, while also creating an appropriately sized gap between the two concrete blocks.

Figure 8:
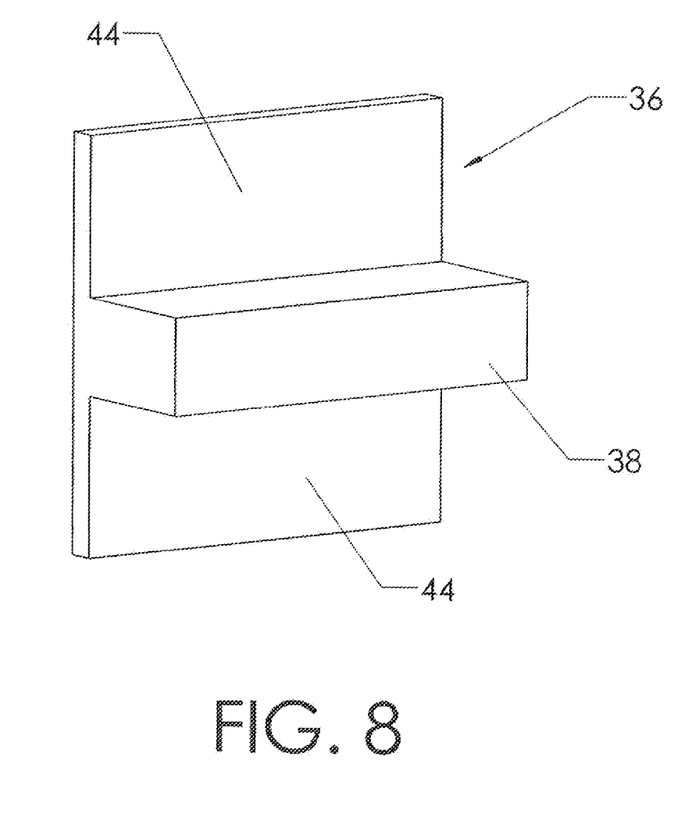
FIG. 8 is a perspective view, showing a spacer provided in the present method.
Figure 9:
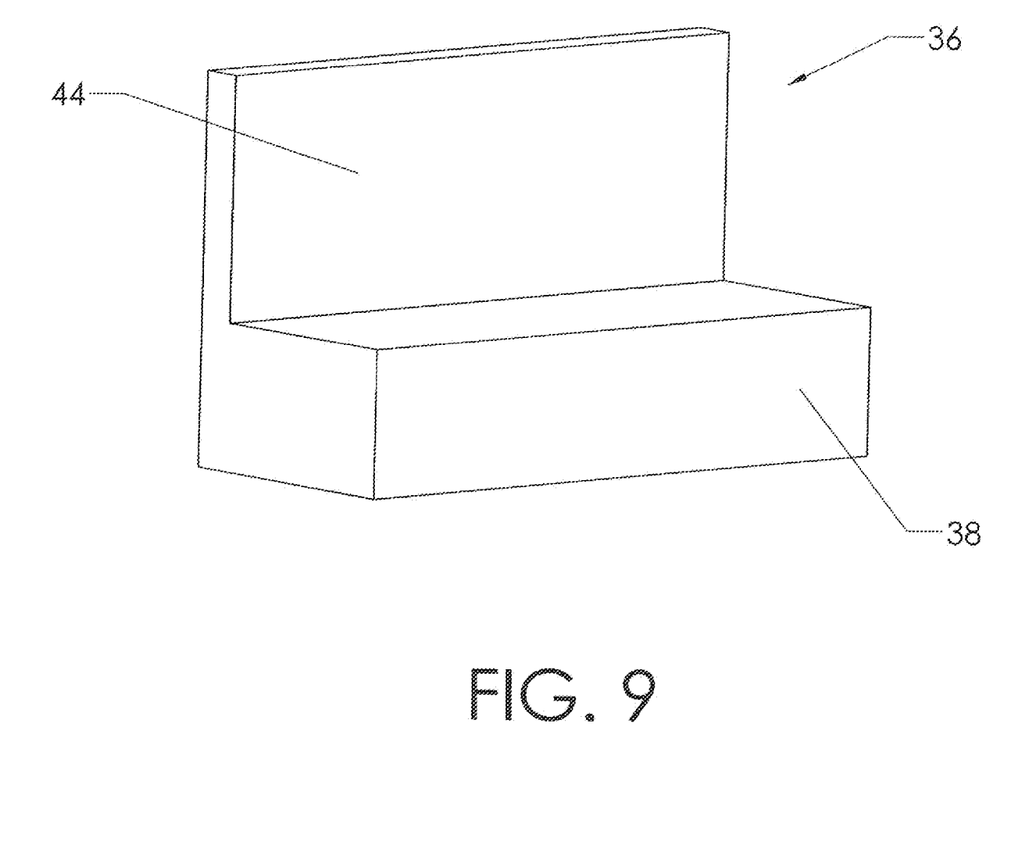
FIG. 9 is a perspective view, showing a spacer provided in the present method.

As illustrated in FIG. 8, a fourth spacer 36 includes planar member 44 and horizontal finger 38. Planar member 44 in fourth spacer 36 is capable of fitting into lateral grooves 32 of two concrete blocks. Spacer 36 can be particularly beneficial in providing additional support for spacing between two concrete blocks at a bed joint. FIG. 9 illustrates a fifth spacer 36 in which planar member 44 fits into the lateral groove of one concrete masonry unit. Horizontal spacer 38 extends across the bottom of planar member 44 and is especially useful in providing a gap on the base of a concrete wall.

Figure 10:
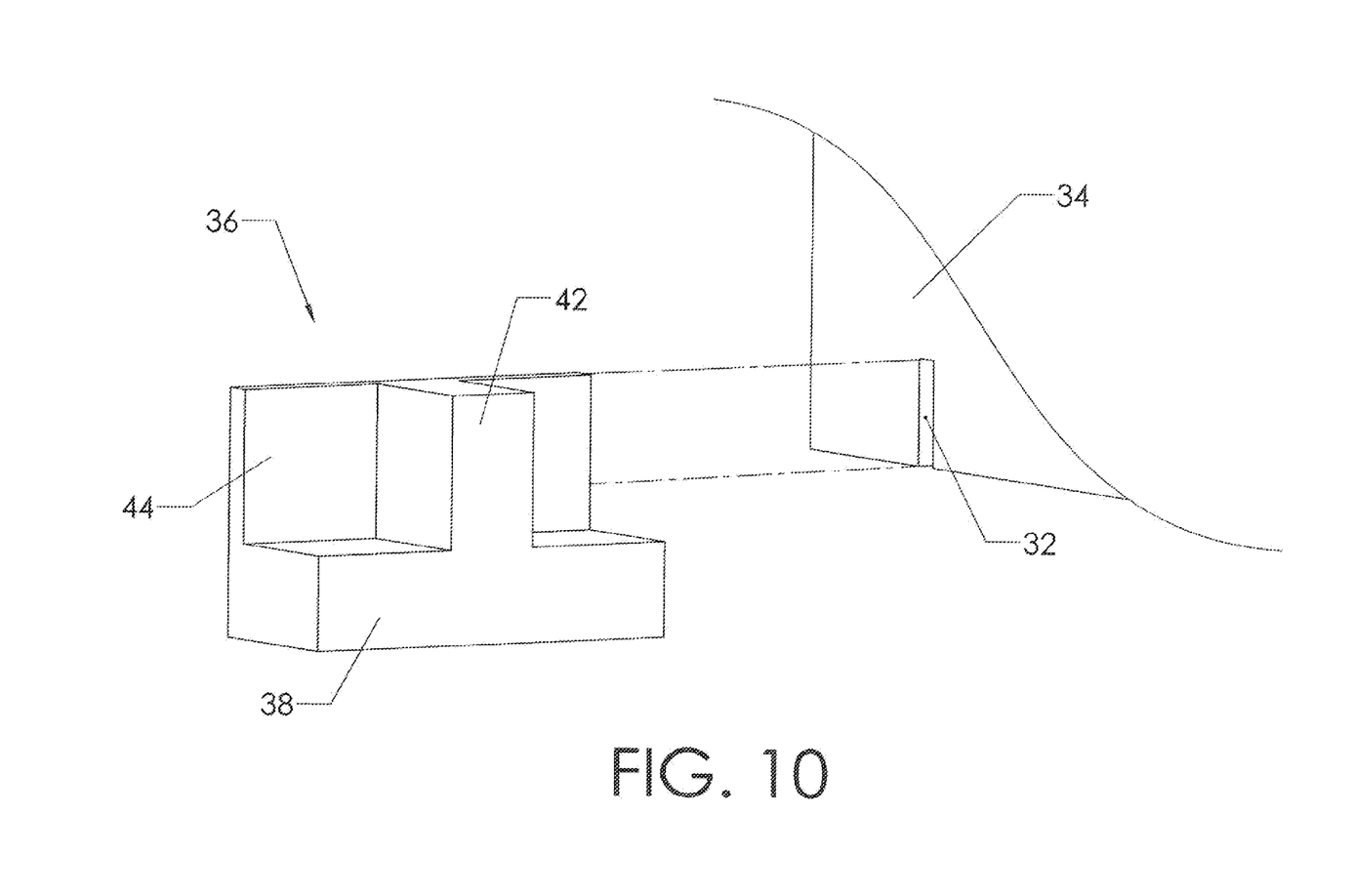
FIG. 10 is an exploded perspective view, showing the step of inserting the spacers into the lateral grooves of the concrete masonry units.
Figure 11:
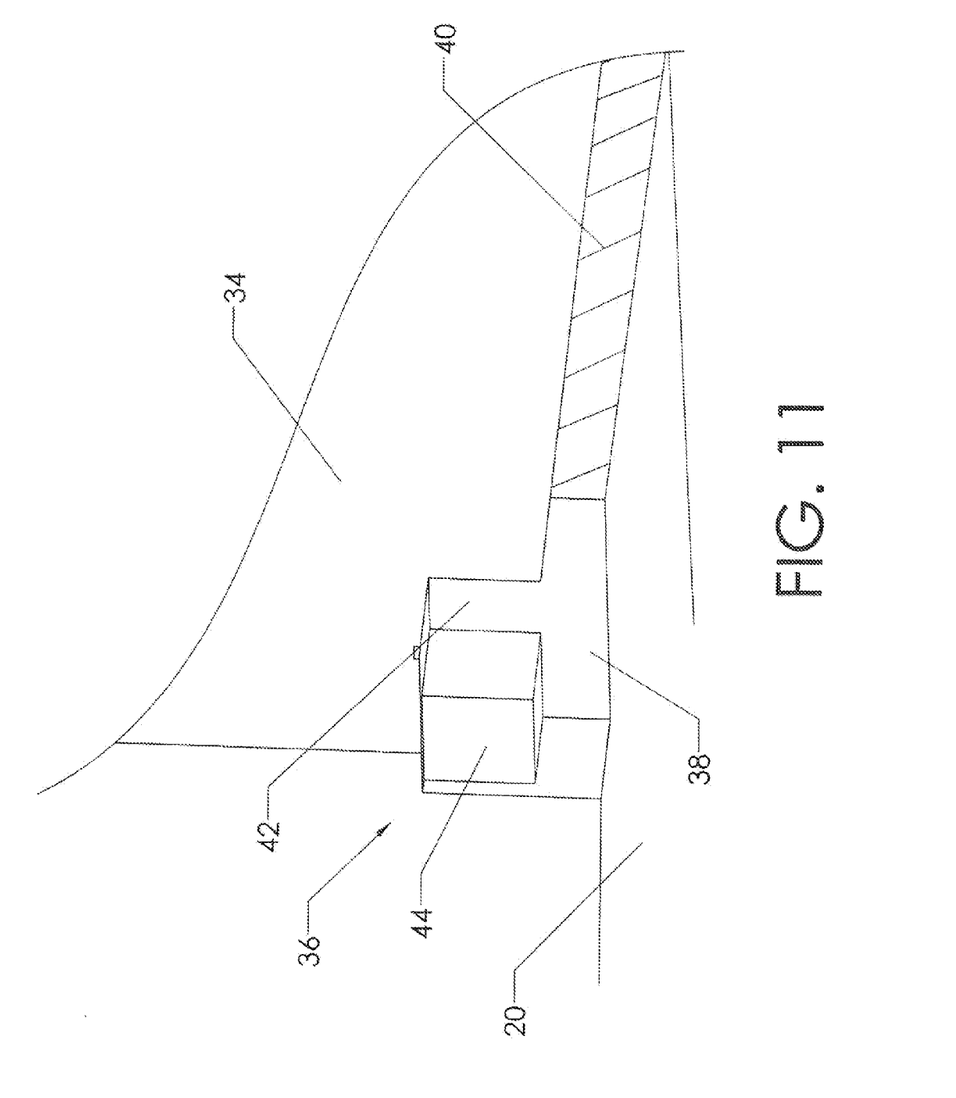
FIG. 11 is an exploded perspective view, showing the spacer inserted fully into the lateral grooves of the concrete masonry unit.

FIG. 10 illustrates the step of pressing or sliding spacer 36 into lateral groove 32 on concrete masonry unit 34. The reader will appreciate that any embodiment of spacers 36 is inserted in this manner. A portion of planar member 44 fits into lateral groove 32 such that horizontal finger 38 and vertical finger 42 fit snugly against surface of concrete masonry unit 34. Once spacers 36 are inserted on the lower portion of concrete block 34, as shown in FIG. 11, the concrete masonry unit 34 can be placed into the mortar 40. FIG. 11 illustrates the utilization of spacer 36 along the base of the first row of concrete masonry units 34. The concrete masonry unit 34 is separated from the surface 20 a particular set distance by horizontal finger 38 of spacer 36. In the preferred method, a series of spacers 36 are utilized to separate concrete masonry blocks 34 from the surface 20 and other concrete blocks.

Figure 12:
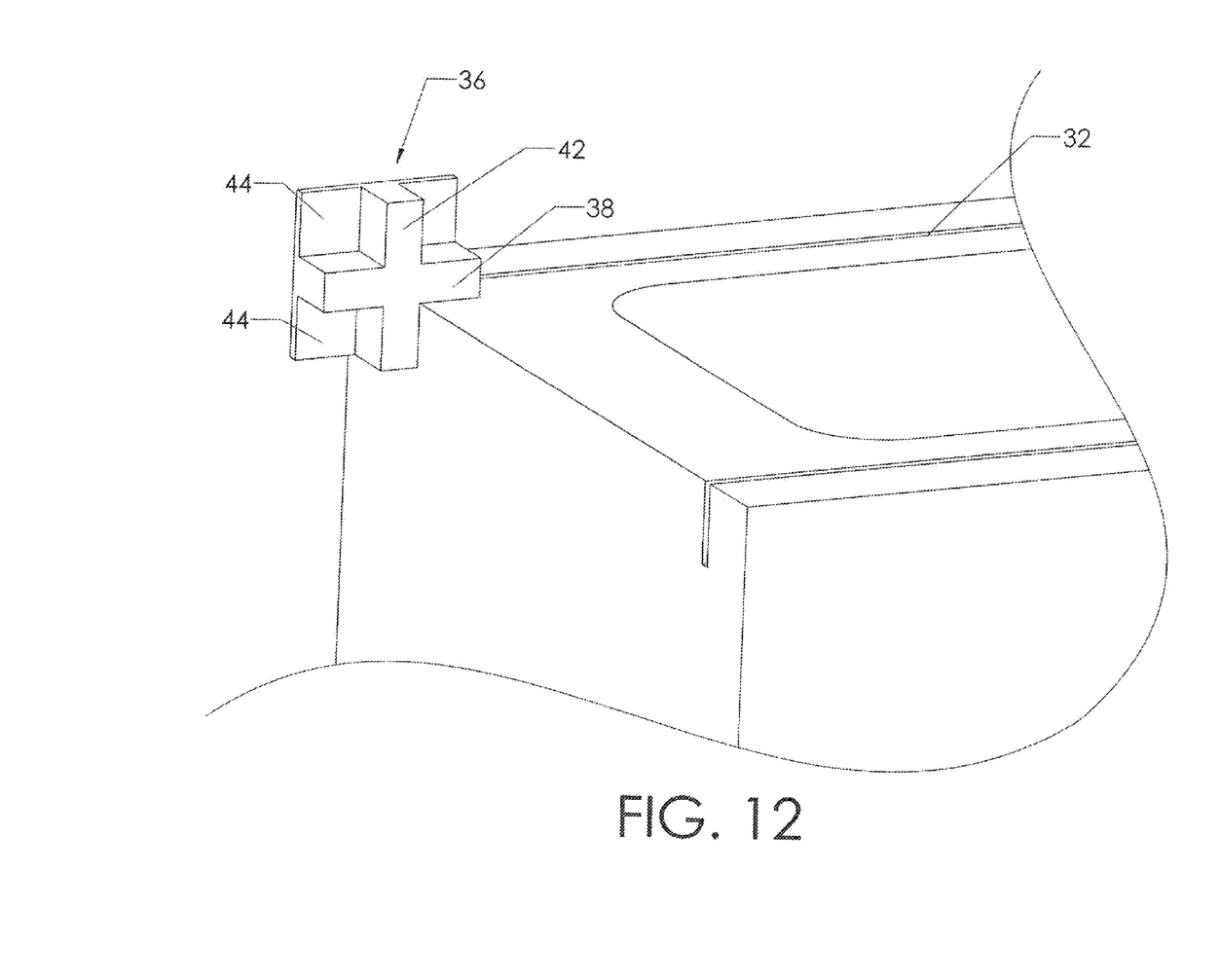
FIG. 12 is a perspective view, showing a spacer inserted into a concrete masonry unit in the present method.

FIG. 12 shows spacer 36 having the ability to insert into lateral grooves 32 of four separate proximate concrete blocks 34. The reader will appreciate that the orientation of four proximate concrete masonry blocks 34 would align the bond pattern such that the joints formed a "plus" at each joint. This type of pattern is known in the industry as a "horizontal stack".

Figure 13:
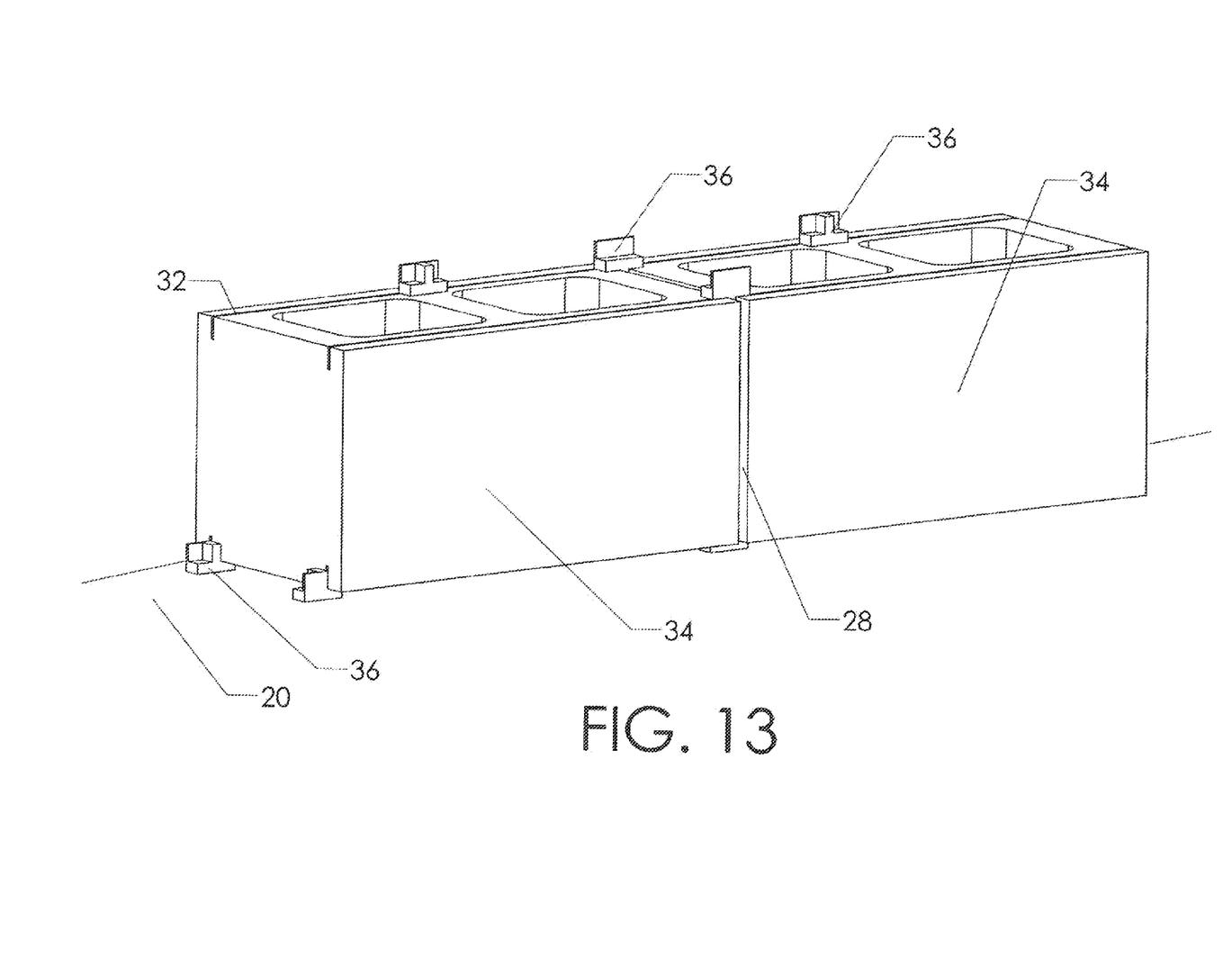
FIG. 13 is a perspective view, showing concrete masonry units stacked on a level surface using the present method.

After the spacers 36 are inserted into the lateral grooves 32 of the concrete, masonry blocks 34 at the desired intervals, the builder will set the concrete blocks 34, including spacers 36 on a level surface 20 lined with mortar 40, as shown in FIG. 13. Spacers 36 are next inserted on the top side 24 of concrete masonry units 34 at the desired intervals. As illustrated, it is preferable that the horizontal and vertical fingers of each spacer 36 line up with the relevant joint where a space is required.

A second row of concrete blocks 34 are set on top of the first row, illustrated in FIG. 14. Spacers 36 can be inserted into lateral grooves 32 either before or after the placement of the concrete blocks 34. However, it is preferable that the spacers 36 are fully inserted into the lateral grooves 32 prior to applying the mortar 40 or setting the concrete blocks 34 onto the mortar 40. The steps of inserting spacers 36 and laying the concrete blocks 34 is repeated until concrete wall 34 is complete. The spacers 36 act to dramatically reduce the amount of time spent adjusting the concrete blocks 34. As illustrated the builder can work quickly and efficiently by applying the spacers 36 at the appropriate joints and intervals. As the wall is built the builder will still make the requisite measurements, however spacers 36 will act to maintain the appropriate distance required at the relevant joint. Additionally, the concrete blocks 34 will remain level and plumb if the spacers are applied correctly.

The preceding description contains significant detail regarding the novel aspects of the present invention. It should not be construed, however, as limiting the scope of the invention but rather as providing illustrations of the preferred embodiments of the invention. As an example, although the illustrated embodiments show a series of spacers, any spacer could be designed which includes a planar member and at least one finger portion. Thus, the scope of the invention should be fixed by the following claims, rather than by the examples given.

The invention claimed is:

1. A method of aligning a plurality of concrete masonry units when constructing a concrete structure on a surface using a substance to adhere said concrete masonry units together, said method comprising the steps of:
   a. providing said plurality of concrete masonry units having:
      (i) a first side and a second side connected to a first end and a second end;
      (ii) a top side and a bottom side having a length and a width;
      (iii) a plurality of grooves on said top side and said bottom side, wherein at least two of said plurality of grooves are cut parallel to one another along said length of said top side and said length of said bottom side;
      (iv) wherein said plurality of grooves are discrete channels defined on three sides by said concrete masonry units;
   b. providing a plurality of spacers having a planar member, at least one horizontal finger, and a vertical finger, wherein said horizontal finger extends through the middle of said planar member and said vertical finger extends upward from said horizontal finger, wherein said planar member is divided into three planar portions;
   c. placing said plurality of concrete masonry units on said surface;
   d. inserting said planar member of said plurality of spacers into said plurality of grooves such that said at least one horizontal finger provides for a set distance between a first concrete masonry unit and a second concrete masonry unit;
   e. stacking said concrete masonry units such that said spacers provide said set distance between said concrete masonry units; and
   f. wherein said horizontal finger is capable of separating said concrete masonry units said set distance along a bed joint.

2. The method as recited in claim 1, wherein said horizontal finger and said vertical finger extend across said planar member such that said planar member is divided into four planar portions.

3. The method as recited in claim 1, wherein said horizontal finger fully extends across a lower end of said planar member.

4. The method as recited in claim 1, wherein said plurality of grooves extend from said first end to said second end of said concrete masonry units.

5. The method as recited in claim 1, wherein said plurality of grooves have a uniform depth and a uniform width.

6. The method as recited in claim 5, wherein said planar member of said spacers is set into said plurality of grooves such that said planar member comes in contact with said concrete masonry unit within one of said plurality of grooves.

7. The method as recited in claim 6, wherein said at least one horizontal finger of said spacer contacts said concrete masonry unit proximate one of said plurality of grooves in order to define said set distance between said plurality of said concrete masonry units.

8. A method of aligning a plurality of concrete masonry units when constructing a concrete structure on a surface using a substance to adhere said concrete masonry units together, said method comprising the steps of:
   a. providing said plurality of concrete masonry units having:
      (i) a first side and a second side connected to a first end and a second end; and
      (ii) a top side and a bottom side having a length and a width;
   b. cutting a plurality of grooves on said top side and said bottom side,
      (i) wherein at least two of said plurality of grooves are cut parallel to one another along said length of said top side and said length of said bottom side extending from said first end to said second end of said concrete masonry units;
      (ii) wherein said plurality of grooves are discrete channels defined on three sides by said concrete masonry units;
   c. providing a plurality of spacers having a planar member, at least one horizontal finger, and a vertical finger, wherein said horizontal finger extends through the middle of said planar member and said vertical finger extends upward from said horizontal finger, wherein said planar member is divided into three planar portions;
   d. placing said plurality of concrete masonry units on said surface;
   e. inserting said planar member of said plurality of spacers into said plurality of grooves such that said at least one horizontal finger provides for a set distance between a first concrete masonry unit and a second concrete masonry unit;
   f. stacking said concrete masonry units such that said spacers provide said set distance between said concrete masonry units; and
   g. wherein said horizontal finger is capable of separating said concrete masonry units said set distance along a bed joint.

9. The method as recited in claim 8, wherein said horizontal finger and said vertical finger extend across said planar member such that said planar member is divided into four planar portions.

10. The method as recited in claim 8, wherein said horizontal finger fully extends across a lower end of said planar member.

11. The method as recited in claim 8, wherein said plurality of grooves have a uniform depth and a uniform width.

12. The method as recited in claim 11, wherein said planar member of said spacers is set into said plurality of grooves such that said planar member comes in contact with said concrete masonry unit within one of said plurality of grooves.

13. The method as recited in claim 12, wherein said at least one horizontal finger of said spacer contacts said concrete masonry unit proximate one of said plurality of grooves in order to define said set distance between said plurality of said concrete masonry units.

* * * * *